United States Patent [19]

Clausen

[11] Patent Number: 4,556,433
[45] Date of Patent: Dec. 3, 1985

[54] APPARATUS AND METHOD FOR CLEANING DIGITAL AUDIO DISCS

[75] Inventor: Eivind Clausen, Bellingham, Wash.

[73] Assignee: Allsop, Inc., Bellingham, Wash.

[21] Appl. No.: 600,495

[22] Filed: Apr. 16, 1984

[51] Int. Cl.[4] .......................... B08B 7/00; G11B 3/58
[52] U.S. Cl. ........................................ 134/6; 15/21 C;
    15/97 R; 15/102; 369/72
[58] Field of Search ................. 134/6, 33; 369/72;
    15/21 C, 97 R, 102

[56] References Cited

U.S. PATENT DOCUMENTS

| | | | |
|---|---|---|---|
| 1,292,349 | 1/1919 | May | 369/72 |
| 1,335,352 | 3/1920 | Slowey | 369/72 |
| 2,266,875 | 12/1941 | Bel | 369/72 |
| 2,296,156 | 9/1942 | Fuller | 369/72 |
| 2,322,470 | 6/1943 | Rojas | 369/72 |
| 2,322,986 | 6/1943 | Weiss et al. | 15/97 |
| 2,563,701 | 8/1951 | Agero | 369/72 X |
| 3,366,390 | 1/1968 | Applequist et al. | 369/72 |
| 3,408,082 | 10/1968 | Crookston | 369/72 |
| 3,803,660 | 4/1974 | Jividen | 15/21 C |
| 4,101,999 | 7/1978 | Doyel | 15/21 B |
| 4,486,916 | 12/1984 | Allsop | 369/72 |

Primary Examiner—S. Leon Bashore
Assistant Examiner—K. M. Hastings
Attorney, Agent, or Firm—Hughes & Cassidy

[57] ABSTRACT

An apparatus and method for cleaning a digitally encoded disc by moving a circumferential wiping surface in a circular path across the periphery of the disc toward the middle of the disc, and again outwardly toward the periphery of the disc. This is accomplished by having a gear drive connection between a rotatable disc support member and a rotatable wiping member positioned above and offset to one side of the support member. Rotation of the cleaning member causes a relatively slower rotation of the support member so that all parts of the disc are properly cleaned.

25 Claims, 5 Drawing Figures

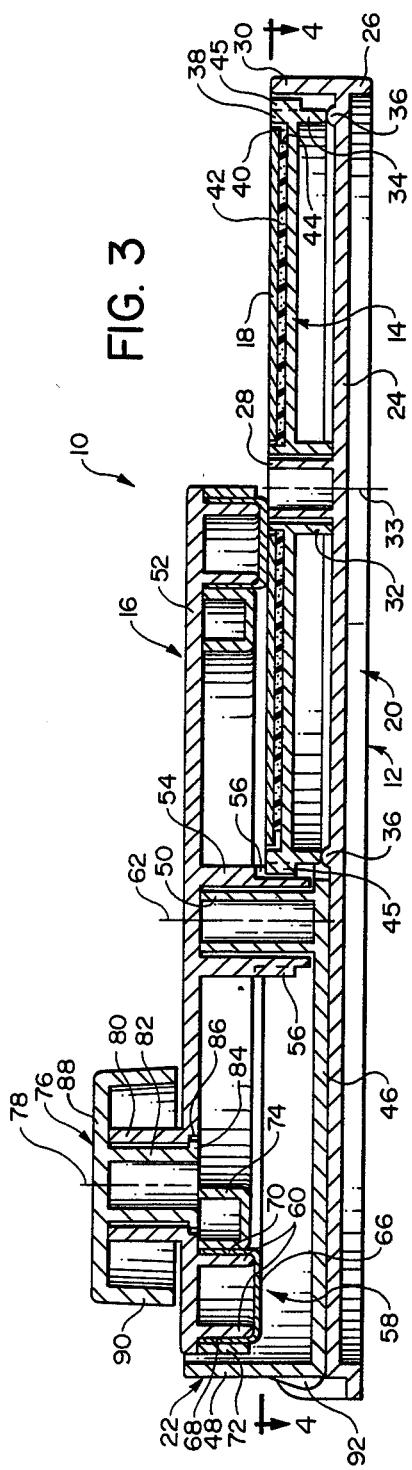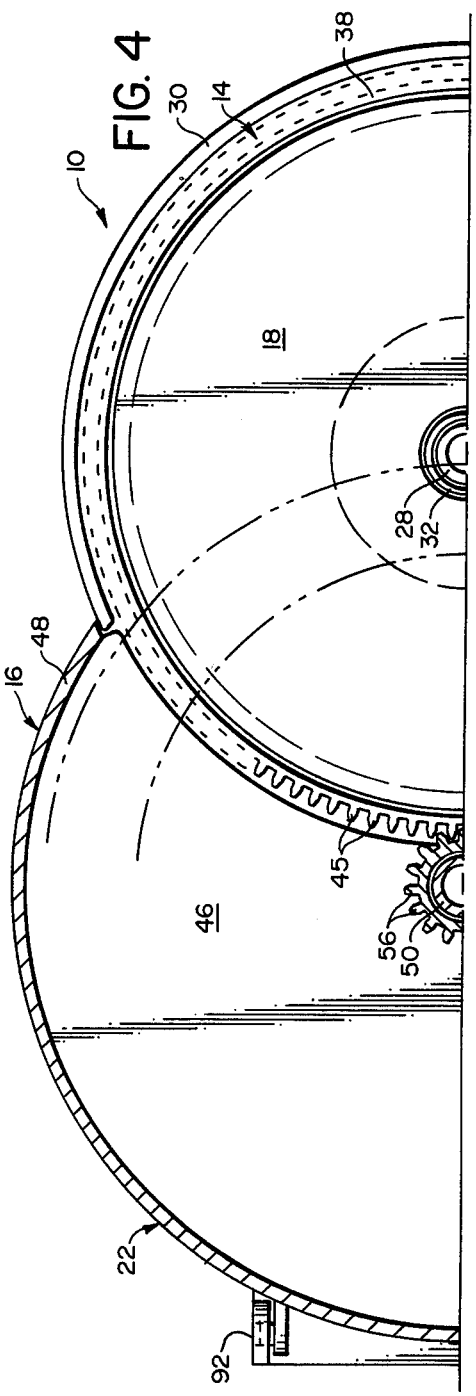

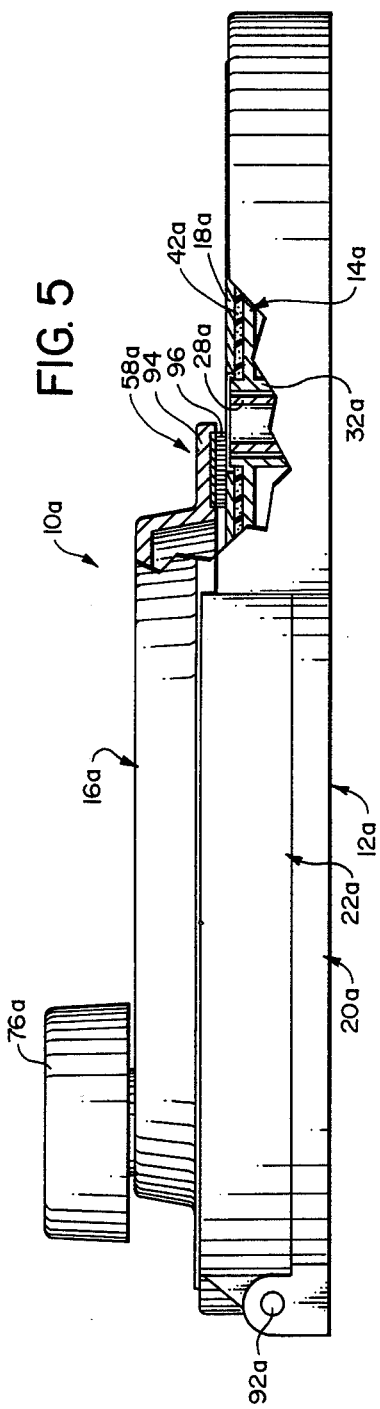

APPARATUS AND METHOD FOR CLEANING DIGITAL AUDIO DISCS

BACKGROUND OF THE INVENTION

1. Field of the Invention

The present invention relates to an apparatus and method for cleaning a surface of an object, and more particularly to cleaning an object such as a digital audio discs, where a desired cleaning motion is on a path between peripheral and middle portions of the disc.

2. Background Art

In a conventional sound recorded disc, where there is a recording groove arranged in a spiral pattern, with the curve of the spiral following a near circular path, it is a common practice to clean the record with a device such as a pad, with the device moving in a circular path along the grooves of the record. However, for discs that are digitally encoded with information, this generally circular cleaning motion is in some respects undesirable. It can sometimes happen that the cleaning member contacting the surface of the disc makes very minute grooves, and such grooves could damage the proper performance of the disc. Accordingly, it would be desirable to effect a cleaning motion over the surface of the disc which would not parallel the circular or near circular encoding on the disc.

A search of the records of the U.S. Patent & Trademark Office has disclosed a number of U.S. patents. These are discussed briefly below.

U.S. Pat. No. 3,408,082, Crookston, shows a record cleaner where the cleaning member is positioned on the surface of the record, and the cleaning member is secured to a string that is in turn tied to a post. Thus, the cleaning member tracks the grooves of the record.

U.S. Pat. No. 2,563,701, Agero, shows a device to resurface grooved phonograph records. The system uses a solvent to soften the record surface, and smoothing elements 66 are rotated relative to the surface of the record to resurface the softened material.

U.S. Pat. No. 2,322,986, Weiss et al, shows a cleaner which is rotatably mounted about an axis that extends from the center of the recording disc. This is particularly adapted to remove the threads and chips from recording blanks during the process of cutting the blank. The cleaning member has the shape of a truncated cone and is rotatably mounted to a rod extending from the center location of the record.

U.S. Pat. No. 2,296,156, Fuller, shows a brush member which has bristles that wipe a record blank that is being cut. The contact of the bristles with the phonograph record will subject the brush to a rotational motion.

U.S. Pat. No. 2,266,875, LeBell, shows a brush that is mounted to a base that is set off to one side of the record. An elongate piece of felt or similar material is disposed in a direction extending radially toward the center of the record.

U.S. Pat. No. 1,335,352, Slowey, shows a record cleaner where there is a rotating brush element. There is a friction disc which is rotatably mounted and engages the periphery of the turntable. The friction disc in turn operates through a pair of gears to rotate a cylindrical brush that has its axis of rotation extending from the periphery of the record toward the middle portion of the record.

U.S. Pat. No. 1,292,349, May, shows a record-cleaning brush which is suspended from the end of an arm. The arm can be swung out of the way when the brush is not to be used.

In view of the foregoing, it is an object of the present invention to provide an effective apparatus and method for cleaning a disc-like member, and more specifically, a disc-like member having digital encoding thereon.

SUMMARY OF THE INVENTION

The apparatus of the present invention is adapted to clean an object, such as a digitally encoded disc, in a cleaning pattern with a wiping action having a path component extending between a peripheral portion and a middle portion of the object. The apparatus comprises a base structure. There is a support member having a support contact surface to support an object to be cleaned at a support location in a general support plane to expose a surface of the object to be cleaned at a contact location having a contact plane. The contact location has a middle support axis having a substantial alignment component generally perpendicular to the contact plane.

There is a cleaning member having a cleaning surface and being mounted to said base member so as to be positioned with the cleaning surface positioned at the contact plane. The cleaning member has a cleaning axis having a substantial alignment component parallel to the support axis and spaced laterally therefrom.

The support member and the cleaning member are mounted for a first path of rotation relative to one another in a manner that the cleaning member rotates about its cleaning axis relative to the support member to cause relative cleaning motion of the cleaning member in a path moving across the contact plane toward and away from said suppport axis. The support member and the cleaning member are also mounted for a second path of relative rotation of the support contact surface about the support axis relative to the cleaning axis.

There is drive transmitting means operatively connected between the support member and the cleaning member in a manner that relative rotation of one of the support member and the cleaning member effects relative rotation of the other of said support member and cleaning member. Thus, as the cleaning member is rotated relative to the support member about the cleaning axis, there is relative rotation of the support member to shift the path of the cleaning motion of the cleaning member relative to the support surface.

More specifically, the support member is rotatably mounted about the support axis which remains stationary relative to the base structure during operation of the apparatus. The cleaning member is mounted for rotation about the cleaning axis which remains stationary relative to the base structure during the operation of the apparatus.

The drive transmitting means desirably comprises a gear transmission, which further comprises at least a first gear mounted to the cleaning member and a second gear mounted to the support member. More specifically, the first and second gear members engage one another directly. In the preferred form, the first gear has a relatively small diameter relative to a diameter of the second gear, whereby rotation of the cleaning member about its cleaning axis is relatively greater than rotation of the support member about the support axis.

In the preferred form, the support surface of the support member is upwardly facing, and the cleaning member has a downwardly facing circumferential cleaning surface. Also, in the preferred form, the cleaning member has a central hub by which it is rotatably mounted to the base structure, and the second gear is formed at the hub.

Another specific feature is that the base structure comprises a first stationary base portion to which the support member is rotatably mounted, and a movable base portion to which the cleaning member is mounted. As shown herein, the movable base portion is pivotally connected at the rear of the base.

In the method of the present invention, an apparatus is provided such as noted above. The object to be cleaned, such as a digitally encoded disc, is placed on a support member, with the cleaning surface in engagement with the object. The cleaning member and the support member are rotated relative to one another as indicated above, to accomplish the cleaning action.

Other features of the present invention will become apparent from the following detailed description.

BRIEF DESCRIPTION OF THE DRAWINGS

FIG. 3 is a longitudinal sectional view taken along line 3—3 of FIG. 1;

FIG. 4 is a sectional view taken in horizontal section along line 4—4 of FIG. 3; and FIG. 5 is a side elevational view similar to FIG. 2, but showing a modified form of the invention, with a portion of the outer wall portions being broken away for purposes of illustration.

DESCRIPTION OF THE PREFERRED EMBODIMENT

Figure 1:
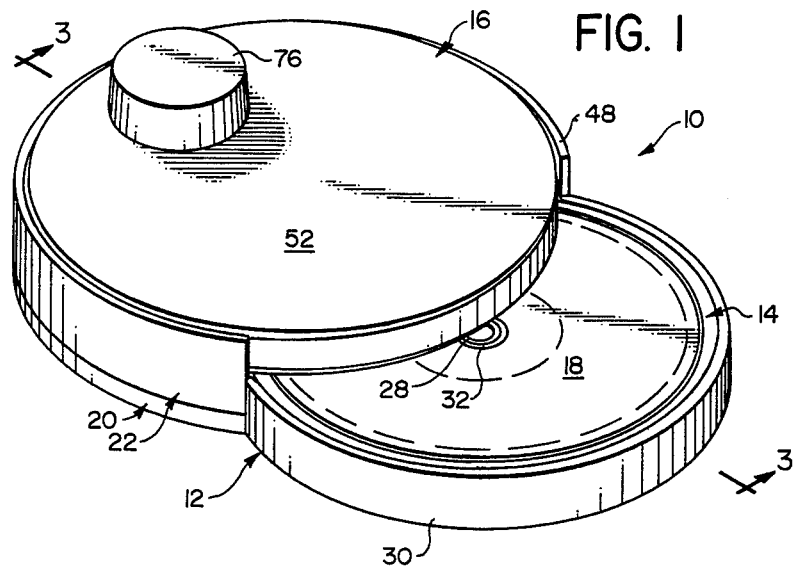
FIG. 1 is an isometric view illustrating the present invention.

The cleaning apparatus 10 of the present invention comprises a base member 12 in which are rotatably mounted a support member 14 and a cleaning member 16. The support member 14 and cleaning member 16 inter-engage one another in driving relationship so that rotation of the cleaning member 16 causes a simultaneous rotation of the support member 14. As will be described more fully later herein, the support member 14 functions to carry a disc 18 which is to be cleaned by the cleaning member 16.

The base member 12 has a stationary base portion 20 and a movable hinged base portion 22. The stationary portion 20 provides support for the apparatus 12 relative to an underlying surface and also provides a rotatable mounting for the support member 14, while the hinged base portion 22 provides rotatable support for the cleaning member 16.

The stationary base portion 20 comprises a lower base plate 24 having a peripheral downturn support lip 26 which engages the underlying surface. Rigidly connected to and extending upwardly from the base plate 24 is a generally cylindrical support post 28 located at the center of the support member 14. Also, there is a peripheral upstanding wall 30 which extends about two-thirds around the circumference of the support member 14, this wall 30 being rigidly connected to the base plate 24.

The support member 14 has the overall configuration of a cylindrical disc, and comprises a center hub 32 having a center through opening to accommodate the post 28. The support member 14 is rotatable about a vertical center axis 33 concentric with the center axis of the post 28 and hub 32. At the periphery of the support member 14, there is a downwardly extending annular support flange 34 that rests against an upwardly protruding circularly spaced bumps 36 formed in the base plate 24. Thus, the support member 14 is rotatably supported and located by the hub 32 being mounted around the post 28 and the flange 34 resting on the ridge 36.

The periphery of the support member 14 has a circumferential lip 38 extending upwardly from the support member 14 a short distance. This lip 38 forms a shallow recess 40 to receive the digital disc 18 which is to be cleaned. Resting on the top surface of the support member 14 is a circular friction pad 42 made of a moderately resilient high friction material (e.g. rubber or a similar material). This pad 42 has a center through opening to fit around the upper edge of the hub 32, and its peripheral edge 44 is spaced inwardly a short distance from the lip 38, in a manner that the diameter of the pad 42 is slightly less than the expected diameter of the disc 18 which is to be cleaned. This is to facilitate the placement of the disc 18 onto and from the support member 14.

Positioned around the entire periphery of the upper lip are a plurality of gear teeth 45 which comprise part of the drive connection by which the support member 14 is rotated. The function of this will be described in more detail later herein.

The movable portion 22 of the base member 12 comprises a lower plate 46 and an upstanding circularly curved edge wall 48 that extends approximately two-thirds around the circumference of the cleaning member 16. Connected to and extending upwardly from the lower plate 46 is a second cylindrically shaped support post 50 located at the center of the cleaning member 16.

The cleaning member 16 has an overall circular configuration, and comprises a main upper circular plate 52 having at its center a downwardly extending hub 54 which is in the form of a cylindrical wall that fits rotatably around the mounting post 50. As will be described later herein, this hub 54 performs two functions. First, it provides a center mounting for the cleaning member 16. Second, the lower outer surface of the hub 54 is made in the form of a gear comprising a plurality of peripheral teeth 56 which mesh with the aforementioned teeth 45 of the support member 14 to provide a drive connection between the members 14 and 16.

Around the periphery of the upper plate 52 there is a cleaning pad assembly 58. This assembly 58 comprises two downwardly extending annular flange members 60 concentrically mounted relative to one another about a vertical center axis 62 of the cleaning member 16. These flange members 60 are made integral with or fixedly connected to the upper plate 52.

A replaceable cleaning pad, made from example from chamois or a chamois-like fabric, is fitted around the lower edges of the two flange members 60, in a manner that there is a lower circumferential cleaning portion 66 and two upstanding securing portions 68 and 70, respectively, with the portion 68 extending around the outer surface of the outer flange 60 and the other portion 70 extending around the inner surface of the inner flage 60. There is an outer removable securing ring 72 pressing against the outer pad securing portion 68, and an inner removable ring 74 positioned within the inner flange member 60 and pressing the inner securing portion 70 against the inner surface of the inner flange 60. Thus, the overall arrangement of the cleaning pad assembly 58 is that there is a circumferential cleaning pad portion 66 positioned beneath the outer circumferential portion of the cleaning member 16 and extending around the entire circumference of the cleaning member 16.

Rotatably mounted to the upper plate 52 is an operating knob or handle 76, mounted about a vertical center axis 78 spaced radially outwardly from the center axis 62 of the cleaning member 16. To mount this knob 76, the upper plate 52 is formed with an upstanding post 80 formed as a cylindrical shell. The knob 76 has an inner cylindrical mounting portion 82 which fits within the post 80 and has a lower peripheral lip 84 which snaps into retaining engagement with an annular recess 86 formed in the lower part of the post 80. The knob 76 further comprises a top circular plate portion 88 and a downwardly extending peripheral skirt or gripping portion 90.

For purposes of further description, the location of the support member 14 will be considered the forward portion of the apparatus 10, while the location of the cleaning member 16 will be considered the rear portion. The movable portion 22 of the base member 12 is hinge mounted at 92 at the rear end of the apparatus 10. Thus, the hinged base portion 22 can be swung upwardly from the solid line position to the dotted line position of FIG. 2, with the base portion carrying the rotatably mounted cleaning member 16 upwardly with it.

To describe the operation of the present invention, let it be assumed that there is a digitally encoded disc 18 which is to be cleaned. As indicated previously, the encoding on such disc 18 is in a generally circular pattern around the center of the disc 18, and it is desirable that the cleaning motion be along lines which are angled relative to the alignment of the circular encoding pattern.

Figure 2:
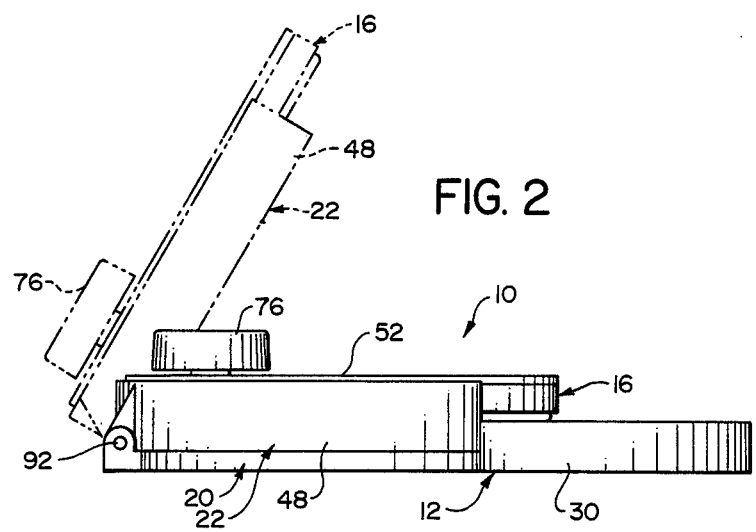
FIG. 2 is a side elevational view of the apparatus of FIG. 1, and illustrating a hinged portion of the apparatus in broken lines in its raised position.

To place the disc 18 in its cleaning position, the hinge mounted base portion 22 is lifted upwardly to the dotted line location of FIG. 2, and the disc 18 is placed on the friction pad 42 as shown in FIG. 3. A suitable cleaning solution can be applied to the cleaning portion 66 of the pad 64 or directly onto the disc. Then the hinged base portion 22 is swung downwardly to the position of FIG. 3, where the cleaning pad portion is located in a contact plane to be in contact with the disc 18. In the operating position, the end edge portions of the walls 30 and 48 are positioned relatively closely to one another, so that these two walls 30 and 48 essentially form an entire peripheral wall of the base member 14. In this position, as can be seen partly in FIG. 4, the circumferential cleaning portion 66 of the cleaning pad 64 extends in two paths, one toward and one away from the center portion of the disc 18 in radially extending direction across the periphery of the disc 18. Also, when the hinged base portion 22 is lowered to its operating position, the gear teeth 56 of the hub 54 come into engagement with the peripheral teeth 45 of the support member 14.

To accomplish the cleaning action, the operating knob 76 is grasped and rotated around the center axis 62 of the cleaning member 16. This moves the cleaning pad portion 66 in a circular path offset from the center axis 33 about which the support member 14 and the disc 18 are centered, so that the path curves in a radially inward direction to the center portion of the disc 18 and then follows the curved path in a radially outward direction away from the center portion and off the edge of the disc 18.

At the same time, the rotation of the teeth 56 of the hub 54 of the cleaning member 16 causes the support member 14 to rotate at a slower rotational speed relative to the rate of rotation of the cleaning member 16. Thus, as the cleaning pad portion 66 continues its wiping motion across the disc 18, the disc 18 is being rotated slowly by the rotation of the support member 14. In the particular embodiment shown herein, the diameter of the gear formed by the teeth 56 is slightly less than one-seventh of the diameter of the gear formed by the teeth 45 of the support member 14 (i.e. a gear ratio of 15 to 110), so that the support member 14 makes one full revolution for seven and one third revolutions of the cleaning member 16.

When the cleaning operation is accomplished, the hinged base portion 22 is swung upwardly and the disc 18 removed. Further, the cleaning pad 64 can be replaced periodically by removing the cleaning member from the hub 50 and then removing the two securing rings 72 and 74.

With regard to the overall operation of the present invention, it can be appreciated that the relative rotation between the support member 14 and the cleaning member 16 is such that the cleaning member travels on a first path of rotation relative to the support member in a manner that the cleaning member 16 rotates about its center axis 62 relative to the support member 14 to cause the relative cleaning motion of the pad portion 66 in a path moving across a plane of contact toward and away from the center portion of the support member 14. Also, there is a second path of relative rotation between the cleaning member 16 and the support member 14 in that the support member 14 rotates relative to the cleaning member 16 about its support axis 33.

A second embodiment of the present invention is shown in FIG. 5. Components of the second embodiment which are similar to components of the first embodiment will be given like numerical designations, with an "a" suffix distinguishing those of the second embodiment.

Thus, there is a cleaning device 10a having a support member 14a and a cleaning member 16a. The cleaning member 16a is turned by a knob 76a.

The main difference in the second embodiment is that the cleaning pad assembly 58a comprises a peripheral horizontally extending flange 90 to which a pad 92 is secured, for example, by a suitable adhesive. The pad 92 is replaced by pulling the pad 92 away from the flange 90 and putting another pad in place, with the new pad being held in place by a second application of adhesive or some other means. In other respects, the operation of this second embodiment is substantially the same as in the first embodiment.

It is to be understood that various modifications could be made in the present invention without departing from the basic teachings thereof.

I claim:

1. An apparatus for cleaning a generally planar surface of an object in a wiping path having wiping path components from a peripheral portion of said surface to a middle portion thereof and from the middle portion back to the peripheral portion of said surface, said apparatus comprising:
    a. a first base member;
    b. a support member having an upwardly facing support contact surface, generally occupying a contact plane, to support the object to be cleaned at a support location and expose the surface of said object at a contact location, said support member being mounted to the first base member for rotation about a generally vertical central support axis;

c. a second base member mounted in said apparatus so as to be movable relative to said first base member between a first operating position and a second non-operating position away from said first base member along a path characterized in that movement from the operating position is at least initially along a path having a substantial upward vertical alignment component;

d. a cleaning member having a downwardly facing circumferential cleaning surface and being mounted to said second base member in a manner that with the second base member in its operating position, at least a portion of the cleaning surface is positioned at the contact location so as to be in contact with the object which is at the support location, with said cleaning member being rotatable about a vertical central cleaning axis which is spaced from said support axis and located within said circumferential cleaning surface, and so that said cleaning member is movable with said second base member when said second base member moves from its operating position to its non-operating position, in a manner that when the second base member is in its non-operating position, said cleaning member is removed from said contact location so as to permit said object to be placed at, and removed from, said contact location;

e. drive means operatively connected between the support member and the cleaning member in a manner that rotation of one of the support member and the cleaning member causes a relative rotation of the other of the support member and the cleaning member in a manner that the support member rotates relative to said first base member about said central support axis and the cleaning member rotates relative to said second base member about said central cleaning axis so that the cleaning surface of the cleaning member moves along said wiping path, and with said support member rotating, said wiping path is being shifted relative to said support member due to rotation of said support member;

f. said drive means comprising at least a first gear connected to said support member, and a second gear connected to said cleaning member and movable therewith when said second base member with said cleaning member is moved between said operating and non-operating positions, said drive means being characterized so that with the second base member in said operating position, the first and second gears are in operative driving engagement, and with the second base member in the non-operating position, the second gear is out of operative driving engagement with the first gear;

g. said drive means being a speed reducing transmission which is characterized in that rotation of said cleaning member at a first rotational rate of speed causes a relatively slower rate of rotation of said support member, whereby said wiping path components have substantial radial alignment components relative to said central support axis;

whereby said second base member can be moved to the non-operating position to expose the contact surface of the support member so that said object can be placed on the contact surface, and said second base member can be moved back to the operating position where the first and second gears come into operative driving engagement, and the cleaning member comes into cleaning engagement with said object.

2. The apparatus as recited in claim 1, wherein said first gear is fixedly connected to the support member and is positioned around a peripheral portion of said support member.

3. The apparatus as recited in claim 2, wherein said drive means is solely a speed reducing gear drive arranged to cause said support member to rotate at a slower rotational speed relative to rotation of said cleaning member.

4. The apparatus as recited in claim 1, wherein said drive means is solely a speed reducing gear drive arranged to cause said support member to rotate at a slower rotational speed relative to rotation of said cleaning member.

5. The apparatus as recited in claim 1, wherein said second base member is pivotally mounted to said first base member.

6. The apparatus as recited in claim 1, wherein there is handle means rotatably mounted to said cleaning member so that said cleaning member can be conveniently rotated manually by grasping said handle means.

7. The apparatus as recited in claim 1, wherein said first base member has a main support portion adapted to rest on an underlying support, and said second base member is mounted to said first base member so as to be supported thereby.

8. The apparatus as recited in claim 1, wherein said first and second gear members engage each other directly.

9. The apparatus as recited in claim 1, wherein said cleaning member has a central hub by which it is rotatably mounted to said second base member, and said second gear is formed at said hub.

10. The apparatus as recited in claim 1, wherein:
a. said first gear is fixedly connected to the support member and is positioned around a peripheral portion of said support member;
b. said drive means is solely a speed reducing gear drive arranged to cause said support member to rotate at a slower rotational speed relative to rotation of said cleaning member;
c. said second base member is pivotally mounted to said first base member;
d. said first base member has a main support portion adapted to rest on an underlying support, and said second base member is mounted to said first base member so as to be supported thereby.

11. The apparatus as recited in claim 10, wherein there is handle means rotatably mounted to said cleaning member so that said cleaning member can be conveniently rotated manually by grasping said handle means.

12. An apparatus for cleaning a generally planar surface of an object in a wiping path having wiping path components from a peripheral portion of said surface to a middle portion thereof and from the middle portion back to the peripheral portion of said surface, said apparatus comprising:
a. a first base member;
b. a support member having an upwardly facing support contact surface, generally occupying a contact plane, to support the object to be cleaned at a support location and expose the surface of said object at a contact location, said support member being mounted to the first base member for rotation about a generally vertical central support axis;

c. a second base member mounted in said apparatus so as to be movable relative to said first base member between a first operating position and a second non-operating position away from said first base member along a path characterized in that movement from the operating position is at least initially along a path having a substantial upward vertical alignment component;

d. a cleaning member having a downwardly facing circumferential cleaning surface and being mounted to said second base member in a manner that with the second base member in its operating position, at least a portion of the cleaning surface is positioned at the contact location so as to be in contact with the object which is at the support location, with said cleaning member being rotatable about a vertical central cleaning axis which is spaced from said support axis and located within said circumferential cleaning surface, and so that said cleaning member is movable with said second base member when said second base member moves from its operating position to its non-operating position, in a manner that when the second base member is in its non-operating position, said cleaning member is removed from said contact location so as to permit said object to be placed at, and removed from, said contact location;

e. drive means operatively connected between the support member and the cleaning member in a manner that rotation of one of the support member and the cleaning member causes a relative rotation of the other of the support member and the cleaning member in a manner that the support member rotates relative to said first base member about said central support axis and the cleaning member rotates relative to said second base member about said central cleaning axis so that the cleaning surface of the cleaning member moves along said wiping path, and with said support member rotating, said cleaning path is being shifted relative to said support member due to rotation of said support member;

f. said drive means being a speed reducing gear transmission comprising a plurality of gear members which, with the second base member in said operating position, have respective axes of rotation which are vertically aligned so that said gear members, said support member and said cleaning member rotate in respective planes substantially parallel to one another, said plurality of gear members comprising at least a first gear supported from said first base member and a second gear supported from, and movable with, said second base member, with said gears coming into driving engagement when the second base member is moved into said first operating position, and with said gears moving out of driving engagement when the second base member is moved out of said first operating position g. said speed reducing gear transmission being characterized in that rotation of said cleaning member at a first rotational rate of speed causes a relatively slower rate to rotation of said support member, whereby said wiping path components have substantial radial alignment components relative to said central support axis.

13. The apparatus as recited in claim 12, wherein said first gear is fixedly connected to the support member and is positioned around a peripheral portion of said support member.

14. The apparatus as recited in claim 13, wherein said drive means is solely a speed reducing gear drive arranged to cause said support member to rotate at a slower rotational speed relative to rotation of said cleaning member.

15. The apparatus as recited in claim 12, wherein said drive means is solely a speed reducing gear drive arranged to cause said support member to rotate at a slower rotational speed relative to rotation of said cleaning member.

16. The apparatus as recited in claim 12, wherein said second base member is pivotally mounted to said first base member.

17. The apparatus as recited in claim 12, wherein there is handle means rotatably mounted to said cleaning member so that said cleaning member can be conveniently rotated manually by grasping said handle means.

18. The apparatus as recited in claim 12, wherein said first base member has a main support portion adapted to rest on an underlying support, and said second base member is mounted to said first base member so as to be supported thereby.

19. The apparatus as recited in claim 12, wherein said first and second gear members engage each other directly.

20. The apparatus as recited in claim 12, wherein said cleaning member has a central hub by which it is rotatably mounted to said second base member, and said second gear is formed at said hub.

21. The apparatus as recited in claim 12, wherein:
a. said first gear is fixedly connected to the support member and is positioned around a peripheral portion of said support member;
b. said drive means is solely a speed reducing gear drive arranged to cause said support member to rotate at a slower rotational speed relative to rotation of said cleaning member;
c. said second base member is pivotally mounted to said first base member;
d. said first base member has a main support portion adapted to rest on an underlying support, and said second base member is mounted to said first base member so as to be supported thereby.

22. The apparatus as recited in claim 21, wherein there is handle means rotatably mounted to said cleaning member so that said cleaning member can be conveniently rotated manually by grasping said handle means.

23. The apparatus as recited in claim 21, wherein:
a. said first and second gear members engage each other directly;
b. said cleaning member has a central hub by which it is rotatably mounted to said second base member, and said second gear is formed at said hub.

24. A method for cleaning a generally planar surface of an object in a wiping path having wiping path components from a peripheral portion of said surface to a middle portion thereof and from the middle portion back to the peripheral portion of said surface, said method comprising:
a. placing said object on a support member having an upwardly facing support contact surface, generally occupying a contact plane, to support the object to be cleaned at a support location and expose the surface of said object at a contact location, said support member being mounted to a first base member for rotation about a generally vertical central support axis;

b. providing a second base member mounted in said apparatus so as to be movable relative to said first base member between a first operating position and a second non-operating position away from said first base member along a path characterized in that movement from the operating position is at least initially along a path having a substantial upward vertical alignment component;

c. providing a cleaning member having a downwardly facing circumferential cleaning surface and being mounted to said second base member in a manner that with the second base member in its operating position, at least a portion of the cleaning surface is positioned at the contact location so as to be in contact with the object which is at the support location, with said cleaning member being rotatable about a vertical central cleaning axis which is spaced from said support axis and located within said circumferential cleaning surface, and so that said cleaning member is movable with said second base member when said second base member moves from its operating position to its non-operating position, in a manner that when the second base member is in its non-operating position, said cleaning member is removed from said contact location so as to permit said object to be placed at, and removed from, said contact location;

d. providing drive means operatively connected between the support member and the cleaning member in a manner that rotation of one of the support member and the cleaning member causes a relative rotation of the other of the support member and the cleaning member in a manner that the support member rotates relative to said first base member about said central support axis and the cleaning member rotates relative to said second base member about said central cleaning axis so that the cleaning surface of the cleaning member moves along said wiping path, and with said support member rotating, said wiping path is being shifted relative to said support member due to rotation of said support member, said drive means comprising at least a first gear connected to said support member, and a second gear connected to said cleaning member and movable therewith when said second base member with said cleaning member is moved between said operating and non-operating positions, said drive means being characterized so that with the second base member in said operating position, the first and second gears are in operative driving engagement, and with the second base member in the non-operating position, the second gear is out of operative driving engagement with the first gear, said drive means being a speed reducing transmission which is characterized in that rotation of said cleaning member at a first rotational rate of speed causes a relatively slower rate of rotation of said support member, whereby said wiping path components have substantial radial alignment components relative to said central support axis;

e. moving said base member with said cleaning member from said non-operating position to said operating position, so as to place said cleaning member into contact with said object, and to place the first and second gears in operative driving engagement;

f. rotating said cleaning member so as to cause the cleaning surface of the cleaning member to move along the wiping path, and to cause relative rotation of the support member so that said wiping path is shifted relative to the object to be cleaned and the support member due to rotation of the support member;

g. moving said second base member and said cleaning member to the non-operating position and removing the object from the support member.

25. The method as recited in claim 24, wherein there is handle means rotatably mounted to said cleaning member, said method further comprising rotating said cleaning member by grasping said handle means and manually rotating said cleaning member.

* * * * *